(12) United States Patent
Schmitt et al.

(10) Patent No.: US 12,186,800 B2
(45) Date of Patent: Jan. 7, 2025

(54) METAL DEPOSITION SYSTEM

(71) Applicant: Fluent Metal Inc., Woburn, MA (US)

(72) Inventors: Peter Schmitt, Brookline, MA (US); Tom Davidson, Lexington, MA (US); Matthew McCambridge, Lexington, MA (US)

(73) Assignee: Fluent Metal, Inc., Cambridge, MA (US)

( * ) Notice: Subject to any disclaimer, the term of this patent is extended or adjusted under 35 U.S.C. 154(b) by 118 days.

(21) Appl. No.: 17/462,780

(22) Filed: Aug. 31, 2021

(65) Prior Publication Data
US 2022/0062983 A1  Mar. 3, 2022

Related U.S. Application Data

(60) Provisional application No. 63/074,261, filed on Sep. 3, 2020.

(51) Int. Cl.
| | | |
|---|---|---|
| *B22D 23/00* | (2006.01) | |
| *B22F 12/00* | (2021.01) | |
| *B22F 12/13* | (2021.01) | |
| *B22F 12/20* | (2021.01) | |
| *B33Y 30/00* | (2015.01) | |

(52) U.S. Cl.
CPC ............ *B22D 23/003* (2013.01); *B22F 12/13* (2021.01); *B22F 12/222* (2021.01); *B33Y 30/00* (2014.12)

(58) Field of Classification Search
CPC ...... B22D 23/003; B22F 12/13; B22F 12/222; B22F 10/22; B22F 12/53; B33Y 30/00; Y02P 10/25
See application file for complete search history.

(56) References Cited

U.S. PATENT DOCUMENTS

| | | |
|---|---|---|
| 3,719,733 A | 3/1973 | Rakestraw et al. |
| 4,375,440 A | 3/1983 | Thompson |
| 4,431,137 A | 2/1984 | Prewett et al. |
| (Continued) | | |

FOREIGN PATENT DOCUMENTS

| | | |
|---|---|---|
| CN | 110814350 A | 2/2020 |
| CN | 111230111 A | 6/2020 |
| (Continued) | | |

OTHER PUBLICATIONS

Amirzadeh et al., "Producing Molten Metal Droplets Smaller than the Nozzle Diameter Using a Pneumatic Drop-On-Demand Generator", Experimental Thermal and Fluid Science 47 (2013) 26-33.
(Continued)

*Primary Examiner* — Anthony M Liang
*Assistant Examiner* — Danny N Kang
(74) *Attorney, Agent, or Firm* — Danielson Legal LLC

(57) ABSTRACT

A system and method of creating molten metal droplets is disclosed. The system may be used for 3D printing. The system relies on a change in momentum of the droplet relative to the tip of the metal microwire to cause the droplet to separate from the tip of the metal microwire. The change in momentum can be created by using an oscillating printhead. In other embodiments, a mass strikes the printhead to cause the droplet to separate from the metal microwire. The metal microwire may be heated using a heat source, such as a laser, an induction coil or a plasma arc.

19 Claims, 10 Drawing Sheets

(56) References Cited

U.S. PATENT DOCUMENTS

| | | | |
|---|---|---|---|
| 4,539,930 | A | 9/1985 | Stuck et al. |
| 4,579,168 | A | 4/1986 | Singer |
| 5,266,098 | A | 11/1993 | Chun et al. |
| 5,268,018 | A | 12/1993 | Mourer et al. |
| 6,202,734 | B1 | 3/2001 | Sackinger et al. |
| 6,309,711 | B1 | 10/2001 | Tseng et al. |
| 6,446,878 | B1 | 9/2002 | Chandra et al. |
| 7,062,849 | B2 | 6/2006 | Ohashi et al. |
| 7,637,403 | B2 | 12/2009 | McGeoch |
| 8,021,593 | B2 | 9/2011 | Murata et al. |
| 8,267,669 | B2 | 9/2012 | Kagan |
| 9,006,296 | B2 | 4/2015 | Itoh et al. |
| 9,616,494 | B2 | 4/2017 | Vader et al. |
| 9,744,763 | B2 | 8/2017 | Joppen et al. |
| 10,040,119 | B2 | 8/2018 | Vader et al. |
| 10,195,665 | B2 | 2/2019 | Sachs et al. |
| 10,201,854 | B2 | 2/2019 | Sachs et al. |
| 10,543,532 | B2 | 1/2020 | Sachs et al. |
| 10,589,352 | B2 | 3/2020 | Mark |
| 10,603,718 | B2 | 3/2020 | Sachs et al. |
| 10,639,716 | B2 | 5/2020 | Myerberg et al. |
| 10,639,718 | B2 | 5/2020 | Sachs et al. |
| 2007/0068996 | A1 | 3/2007 | Farnworth |
| 2013/0287934 | A1 | 10/2013 | Ramsundar |
| 2014/0265037 | A1 | 9/2014 | Stirling et al. |
| 2017/0056966 | A1 | 3/2017 | Myerberg et al. |
| 2017/0158543 | A1 | 6/2017 | Metz et al. |
| 2018/0290194 | A1 | 10/2018 | Jabbari et al. |
| 2018/0297288 | A1 | 10/2018 | Barbati et al. |
| 2018/0304370 | A1* | 10/2018 | Myerberg .......... G05B 19/4099 |
| 2019/0015884 | A1 | 1/2019 | Batchelder et al. |
| 2019/0022725 | A1 | 1/2019 | Bauer et al. |
| 2019/0143449 | A1 | 5/2019 | Zenou |
| 2019/0255615 | A1 | 8/2019 | Liang |
| 2019/0351488 | A1 | 11/2019 | Vader et al. |
| 2020/0139468 | A1 | 5/2020 | Albrecht et al. |
| 2020/0324486 | A1 | 10/2020 | Mantell et al. |

FOREIGN PATENT DOCUMENTS

| | | |
|---|---|---|
| EP | 0682988 A1 | 11/1995 |
| GB | 2111536 A | 7/1983 |
| JP | 01-247507 A | 10/1989 |
| JP | 2016-196687 A | 11/2016 |
| KR | 2003-0041643 A | 5/2003 |
| WO | 2017/001100 A2 | 1/2017 |
| WO | 2017/050592 A1 | 3/2017 |
| WO | 2017/084500 A1 | 5/2017 |
| WO | 2017/089176 A1 | 6/2017 |
| WO | 2018/041259 A1 | 3/2018 |
| WO | 2018/045968 A1 | 3/2018 |
| WO | 2018167209 A1 | 9/2018 |
| WO | 2020/061542 A1 | 3/2020 |
| WO | 2020/061544 A1 | 3/2020 |
| WO | 2020/120317 A1 | 6/2020 |

OTHER PUBLICATIONS

Banitabaei et al., "Pneumatic Drop Generator: Liquid Pinch-Off and Velocity of Single Droplets", (2016) 505 Escspe 204-213.

Hajjar et al., "Producing Large Molten Metal Droplets Using a Pneumatic Drop-On-Demand Generator", Conference:—ILASS—Europe 2014, 26th Annual Conference on Liquid Atomization and Spray Systems, Sep. 2014, Bremen, Germany.

Jeromen et al., "Modelling of Resonant Droplet Detachment in Laser Metal Droplet Generation", Physics Procedia, vol. 39, 2012, pp. 863-871.

Lass et al., "Enhanced Liquid Metal Micro Droplet Generation by Pneumatic Actuation Based on the StarJet Method", Micromachines 2013, 4, 49-66.

Lass et al., "Rapid Prototyping of 3D Microstructures by Direct Printing of Liquid Metal at Temperatures up to 500 Using the Starjet Technology", Conference: Solid-State Sensors, Actuators and Microsystems Conference (Transducers), Jun. 5-9, 2011.

Moqadam et al., "A High Temperature Drop-On-Demand Droplet Generator for Metallic Melts", Micromachines 2019, 10, 477.

Moqadam et al., "Reproducibility of High-Throughput Sample Properties Produced by a High-Temperature Molten Metal Droplet Generator", Metals, 10, 297, 2020.

Moqadam et al., "Microstructure Adjustment of Spherical Micro-samples for High-Thoughput Analysis Using a Drop-on-Demand Droplet Generator", Materials, 12, 3769, 2019.

Murr et al., "3D Metal Droplet Printing Development and Advanced Materials Additive Manufacturing", Journal of Materials Research and Technology, JMRTEC-236, 2017.

Orme et al., "Charged Molten Metal Droplet Deposition as a Direct Write Technology", Dept. of Mech. & Aerospace Eng., University of California, MRS 2000 Spring Meeting, San Francisco, Apr. 2000.

Orme et al., "Recent Advances in Highly Controlled Molten Metal Droplet Formation From Capillary Stream Break-Up with Applications to Advanced Manufacturing", 2000 TMS Annual Meeting, Mar. 12-16, 2000 Nashville TN.

Sukhotskiy et al., "Magnetohydrodynamic Drop-on-Demand Liquid Metal 3D Printing", Solid Freeform Fabrication 2017: Proceedings of the 28th Annual International, Solid Freeform Fabrication Symposium—An Additive Manufacturing Conference.

Suter et al., "MHD printhead for additive manufacturing of metals", Procedia CIRP, vol. 2, 2012, pp. 102-106.

Tian et al., "A Microfluidic Chip for Liquid Metal Droplet Generation and Sorting", Micromachines 8, 39, 2017.

Uhlenwinkel et al., "High Temperature Drop-on-Demand System", 2014 World Congress on Powder Metallurgy and Particulate Materials, Orlando, Florida, May 18-22, 2014.

Zhang et al., "Geometry Control of Closed Contour Forming in Uniform Micro Metal Droplet Deposition Manufacturing", Journal of Materials Processing Technology, vol. 243, May 2017, pp. 474-480.

International Search Report and Written Opinion mailed Feb. 7, 2022 in corresponding PCT application No. PCT/US2021/048437.

Eurasian Action for Application No. 202300021 dated Jul. 28, 2023 (2 pages).

* cited by examiner

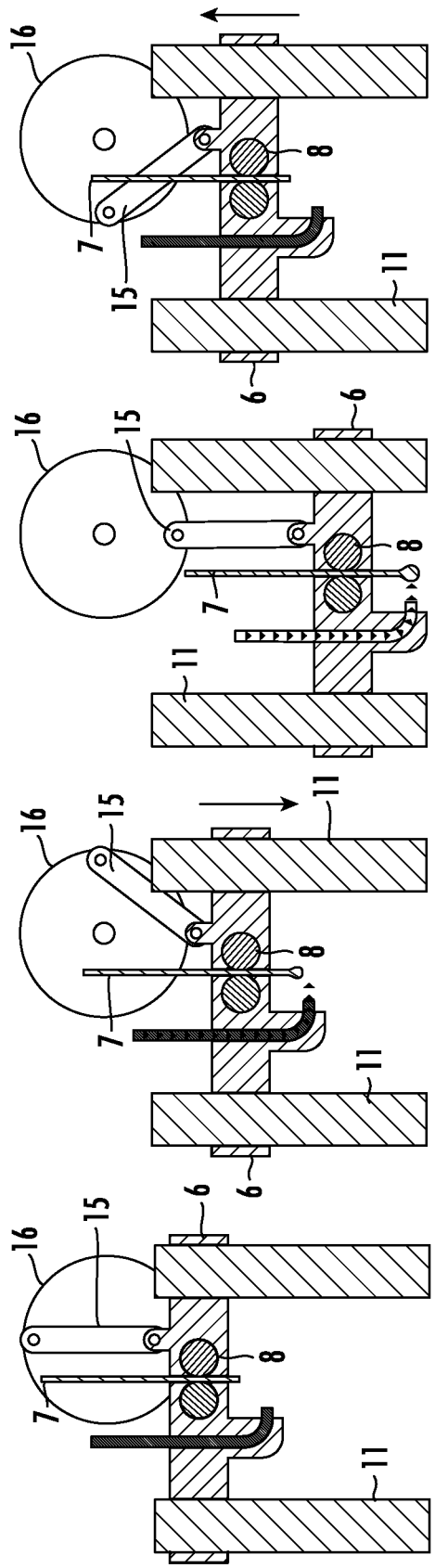

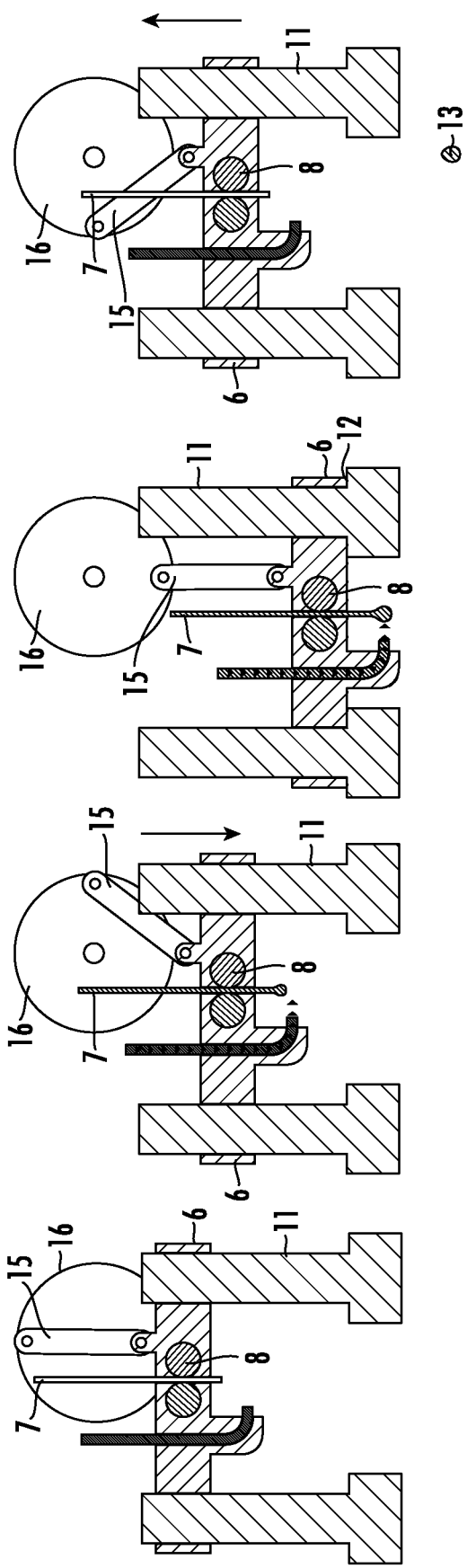

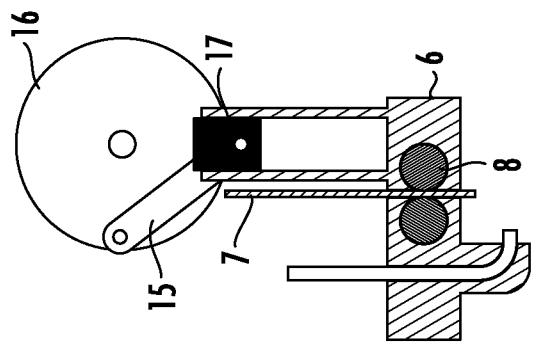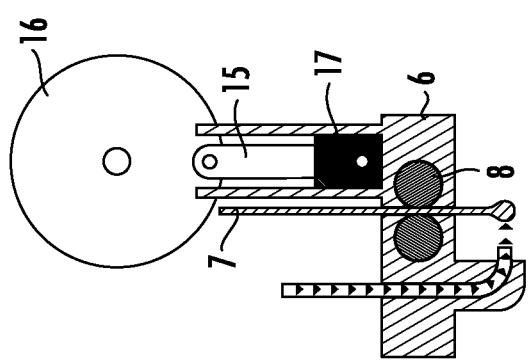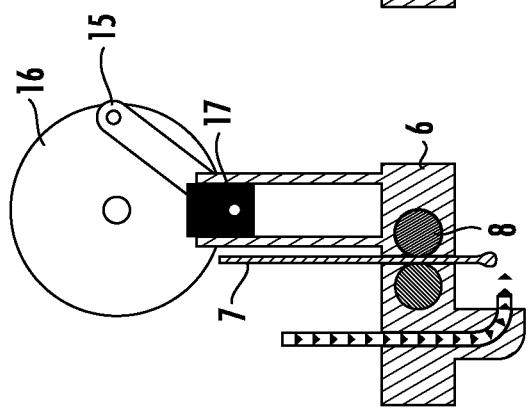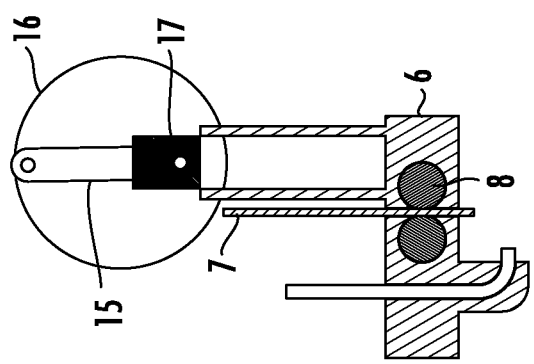

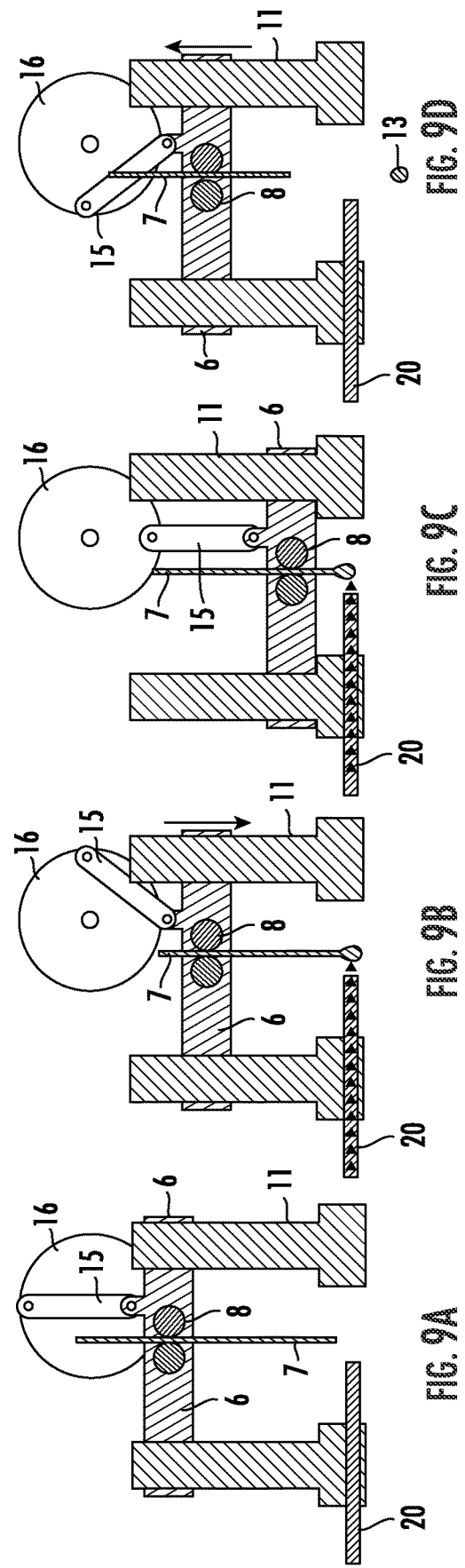

METAL DEPOSITION SYSTEM

This application claims priority of U.S. Provisional Patent Application 63/074,261, filed Sep. 3, 2020, the disclosure of which is incorporated herein by reference in its entirety.

FIELD

Embodiments of the present disclosure relate to devices, systems, methods and processes for generating or creating molten metal droplets on demand for additive manufacturing, layered creation of objects and parts, 3D printing or liquid metal printing.

BACKGROUND

In the field of liquid metal printing, molten metal droplets are used to build up 3 dimensional (3D) parts and objects by dispensing droplets onto a build-platform in layers. Various processes are commonly used.

One such process separates a molten metal droplet from the tip of a metal microwire by use of laser energy bursts evaporating some of the molten metal within a channel or tube acting as nozzle and guiding the evaporation propelled molten metal droplet onto a desired trajectory.

Other processes commonly include reservoirs, crucibles, pools or other containments of molten metal from which droplets are generated using a single nozzle or, in some instances, multiple nozzles. For a commercially viable metal additive manufacturing process, any crucibles feeding a single nozzle or multiple nozzles present many challenges including:

- consistency and repeatability of the molten metal droplet trajectory;
- drop on demand in multi nozzle scenario;
- scalability of metal throughput;
- high temperature materials;
- complexity of control systems;
- maintenance scope and intervals; and
- time between failures.

As noted above, these processes have shortcomings. Therefore, it would be beneficial if there were a system and method that allows molten metal droplets to be created without the use of molten metal pools and nozzles. Further, it would be advantageous if this system and method did not rely on a guide channel or evaporation of metal.

SUMMARY

A system and method of creating molten metal droplets is disclosed. The system may be used for 3D printing. The system relies on a change in momentum of the droplet relative to the tip of the metal microwire to cause the droplet to separate from the tip of the metal microwire. The change in momentum can be created by using an oscillating printhead. In other embodiments, a mass strikes the printhead to cause the droplet to separate from the metal microwire. The metal microwire may be heated using a heat source such as a laser, an induction coil or a plasma arc.

According to one embodiment, a system for forming molten metal droplets on demand is disclosed. The system comprises a carriage; an actuator, wherein metal microwire is advanced by the actuator; a heat source positioned proximate a tip of the metal microwire, thereby causing the tip of the metal microwire to be heated past its melting point such that a droplet is formed; and a mechanism to create a change in momentum of the carriage, wherein the change in momentum of the droplet relative to the tip of the metal microwire causes the droplet to separate from the tip of the metal microwire. In certain embodiments, the system further comprises a substrate for receiving the droplet, wherein the substrate is movable relative to the carriage in an X, Y, and Z direction. In some embodiments, the carriage is disposed between linear guides, such that movement of the carriage is limited to one direction by the linear guides. In certain embodiments, the change in momentum of the droplet relative to the tip of the metal microwire is accomplished by oscillatory motion of the carriage within the linear guides. In some embodiments, the change in momentum of the droplet relative to the tip of the metal microwire is accomplished by oscillatory motion of the carriage with a hard stop against the linear guides. In certain embodiments, the change in momentum of the droplet relative to the tip of the metal microwire is accomplished by momentum transfer to the droplet by a mass striking the carriage. In some embodiments, the heat source comprises a laser to emit a laser beam. In some embodiments, light from the laser is delivered to a region proximal to the tip of the metal microwire by a fiber optic cable. In some embodiments, the fiber optic cable comprises a lens to focus the laser beam on the tip of the metal microwire. In some embodiments, the heat source comprises an induction coil positioned around the tip of the metal microwire. In some embodiments, the heat source comprises two electrodes, wherein a voltage is applied to at least one of the two electrodes to create a plasma arc proximate the tip of the metal microwire. In some embodiments, the heat source comprises an electrode, where a voltage is applied to at least one of the electrode and the metal microwire to create a plasma arc proximate the tip of the metal microwire. In certain embodiments, the system comprises at least a second actuator, wherein there are a plurality of supplies of metal microwire each being fed by its own respective actuator, and each being melted by a heat source, with each droplet separating due to the change in momentum of the droplet relative to the respective metal microwire. In certain embodiments, the heat source is affixed to the carriage and the actuator feeds metal microwire toward the heat source while the carriage is moving. In some embodiments, the heat source is affixed to one of the linear guides, such that the heat source does not move with the carriage. In certain embodiments, the carriage moves in an up and down direction. In some embodiments, the actuator is mounted on the carriage. In some embodiments, the heat source is designed such that the quantity and rate of heat energy applied to the tip of the metal microwire is such that the metal microwire above the tip remains a solid. In certain embodiments, the metal microwire above the tip remains a solid due to active temperature management of the metal microwire, such as via conduction or convection.

BRIEF DESCRIPTION OF THE FIGURES

For a better understanding of the present disclosure, reference is made to the accompanying drawings, which are incorporated herein by reference and in which:

FIGS. 4A-4D show one mechanism to separate the droplet from the metal microwire;

FIGS. 5A-5D show a second mechanism to separate the droplet from the metal microwire;

FIGS. 6A-6D show a third mechanism to separate the droplet from the metal microwire;

FIGS. 9A-9D show one mechanism to heat and separate the droplet from the metal microwire using a stationary heat source.

DETAILED DESCRIPTION

Figure 1:
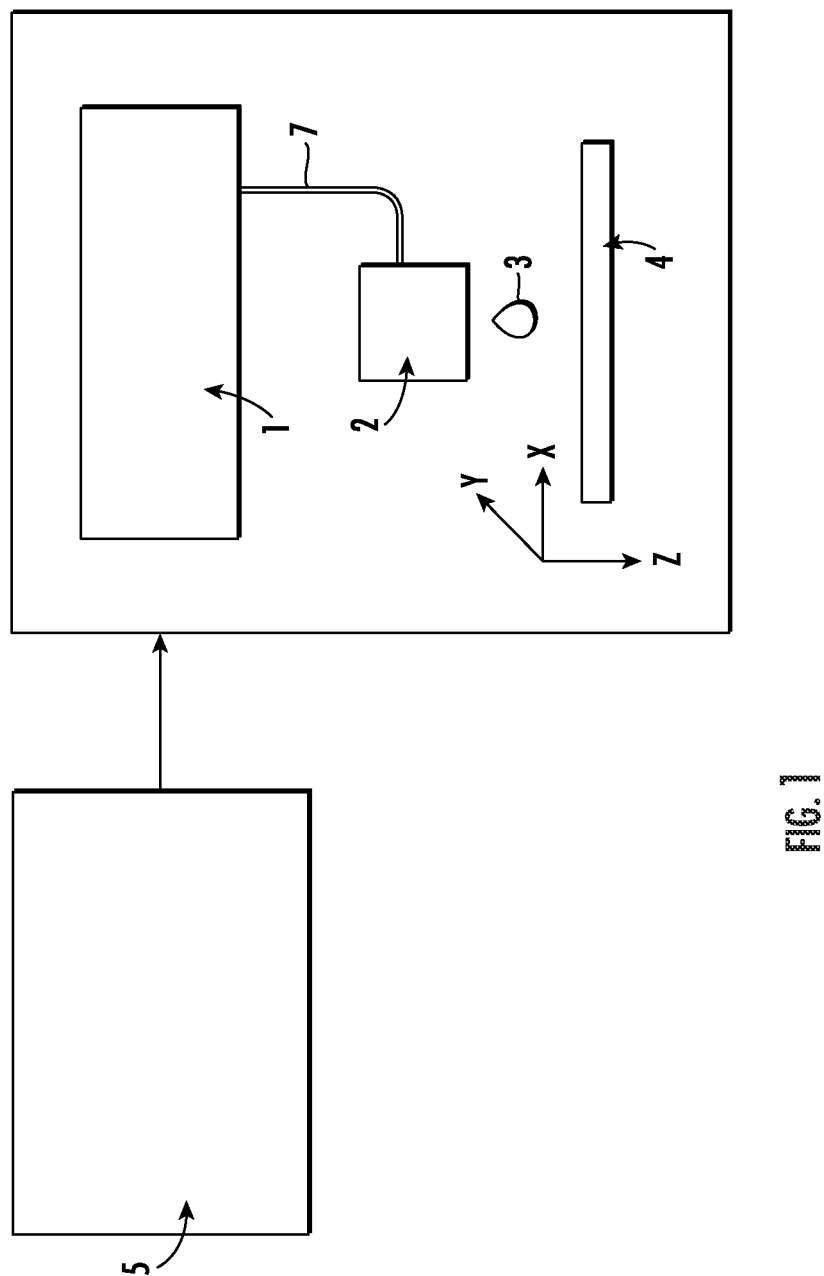
FIG. 1 shows an apparatus for the deposition of molten metal according to one embodiment.

FIG. 1 shows an apparatus creating molten metal droplets. These molten metal droplets are used to build up 3 dimensional (3D) parts and objects by dispensing droplets onto a build-platform in layers.

The apparatus comprises one or more metal wire sources 1. These metal wire sources 1 may be metal microwire cartridges, spools or supplies. In the embodiment where more than one metal wire source 1 is employed, these metal wire sources 1 may contain the same or different types of metal microwire. A printhead 2 is in communication with the metal wire sources 1. The printhead 2 generates molten metal droplets 3 that are ejected towards a build platform 4 on which metal parts are created from layers.

A controller 5, such as a computer, server, dedicated microcontroller or other suitable processing unit, supplies instructions to the apparatus. The controller 5 may be directly attached to the apparatus or may communicate through a network or the internet.

The instructions from the controller to the apparatus are derived from the desired part to be created. The desired part is sliced into a plurality of cross-sectional areas, each corresponding to a respective one of the layers by which the apparatus will build up the part.

The metal microwire 7 may be in the range of 50 to 3000 micrometers in diameter. The advancement of the metal microwire 7 from the metal wire source 1 to the printhead 2 may be achieved through the use of a piezo actuator, a stepper motor or a voice-coil. In certain embodiments, there is a single actuator to advance the metal microwire. In other embodiments, multiple actuators working together may be used.

The printhead 2 may contain a single molten metal droplet generator or an array of molten metal droplet generators, each being supplied with the same type of metal microwire or different types of metal microwire. The printhead 2 ejects molten metal droplets 3 towards a build platform 4 through use of the molten metal droplet generators. The printhead 2 is capable of ejecting droplets at a maximum frequency. The minimum time between droplets may be referred to as a droplet generation cycle. Additionally, the printhead 2 is capable of skipping one or multiple droplets, also referred to as drop on demand. In the XY plane, the printhead 2 and build platform 4 move relative to each other either in a vector, tool-path kind of trajectory or in a rastering scanning type of motion. The ejected molten metal droplets 3 are laid down in a layer according to the instruction sent by the controller 5. As noted above, the 3-dimensional part or object is built up from multiple layers. The printhead 2 and the build platform 4 may also more relative to each other in the Z direction.

Figure 2:
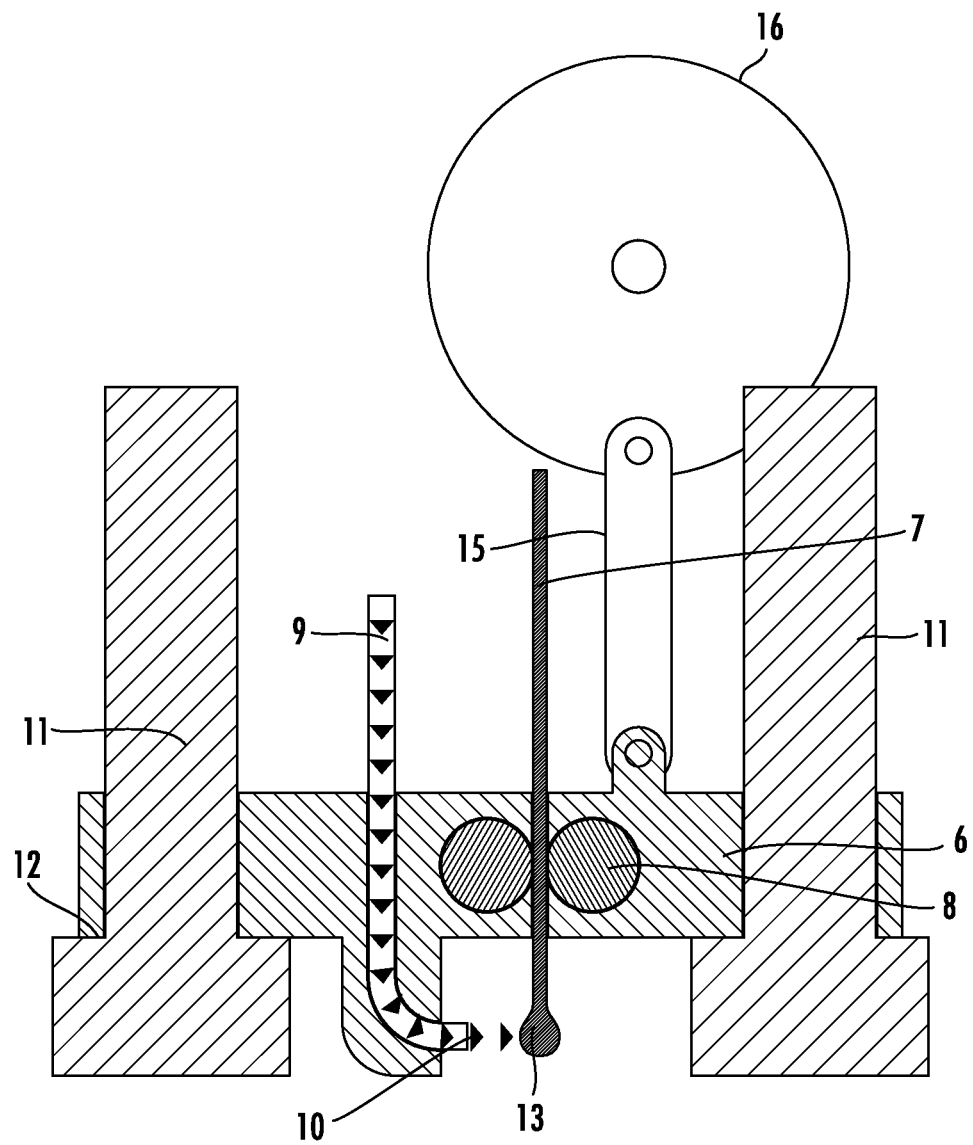
FIG. 2 shows a printhead according to one embodiment.

FIG. 2 shows an expanded view of the printhead 2. The printhead 2 includes a carriage 6, which holds the metal microwire 7. The carriage 6 is held by linear guides 11, disposed on opposite sides of the carriage 6. The carriage 6 may be able to move relative to the linear guides 11, such as in an up and down direction. In certain embodiments, the linear guides 11 limit the movement of the carriage to only one direction, such as up and down, left and right, or forward and backward. For example, a rod 15 or other rigid member may be used to connect the carriage 6 to a rotating component 16, such as a cylinder. The rotating component 16 may be driven by a motor at a fixed or variable RPM. The rod 15 is coupled to the rotating component 16 at a location that is not the axis of rotation. The center of the rotating component 16 is fixed, such that rotation of the rotating component 16 causes the rod 15 to move in a reciprocating fashion, causing the carriage 6 to move relative to the linear guides 11. The rotating component 16 may rotate at the maximum frequency of the print head, such that the carriage 6 moves up and down for the generation of each droplet. In certain embodiments, the carriage 6 may move in the X or Y directions relative to the linear guides 11.

Within the carriage 6 may be one or more actuators 8 to advance the metal microwire 7 through the carriage 6. In some embodiments, the actuators 8 may be located on the carriage 6. In other embodiments, the actuators 8 may be locator off the carriage 6, in which case a flexible drive shaft may connect the carriage 6 to the actuators 8. The actuators 8 may be piezo electric devices or motors. The metal microwire 7 is advanced in a way such that the distance advanced can be controlled.

A variety of different heat sources may be used to heat the tip of the metal microwire 7 to form the metal droplet 13.

In one embodiment, light conduit 9, such as a fiber optic cable, may be disposed proximate the carriage 6. Light, in the form of a laser beam, may be transmitted through the light conduit 9. The light conduit 9 may have a curved portion such that the laser beam is focused at the end of the metal microwire 7. The fiber optic cable may include a lens 10 to focus the emergent beam at the tip of the metal microwire 7. The energy from the laser beam may cause the tip of the metal microwire 7 to transition from a solid to a liquid, so as to form a droplet.

Figure 3:
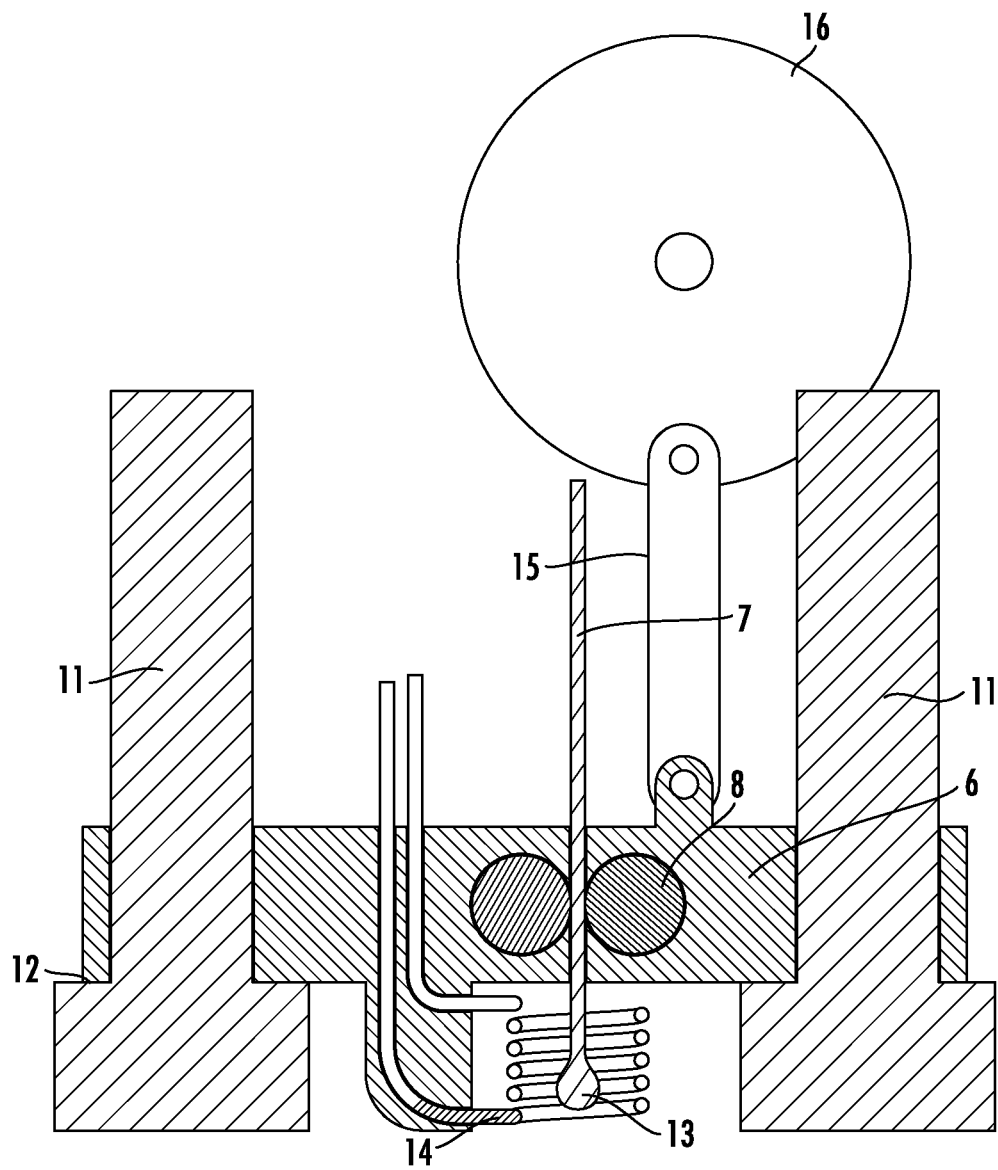
FIG. 3 shows a printhead according to a second embodiment.

In another embodiment, a laser may not be used. Rather, a different heat source, such as an induction coil, may be used to heat the tip of the metal microwire 7 to create a liquid. This embodiment is shown in FIG. 3. Similar components have been given identical reference designators. In this embodiment, the laser is replaced with an induction coil 14, which may encircle the tip of the metal microwire 7. When a quantity of power is applied to the induction coil 14, as determined according to the properties of the induction coil 14 and the material, diameter and length of the metal microwire within it, the tip of the metal microwire 7 is heated and transitions to the liquid state.

Figure 7A:
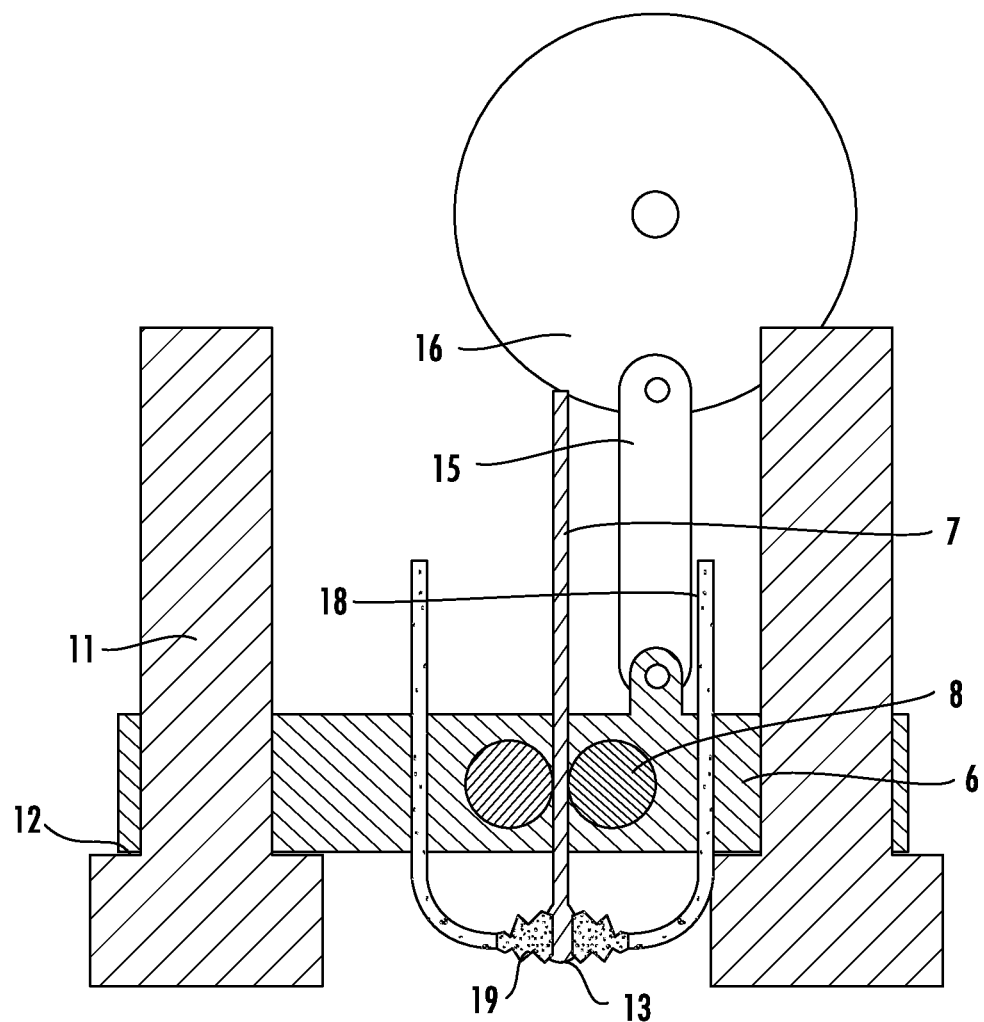
FIGS. 7A-7B show the printhead according to another embodiment.
Figure 7B:
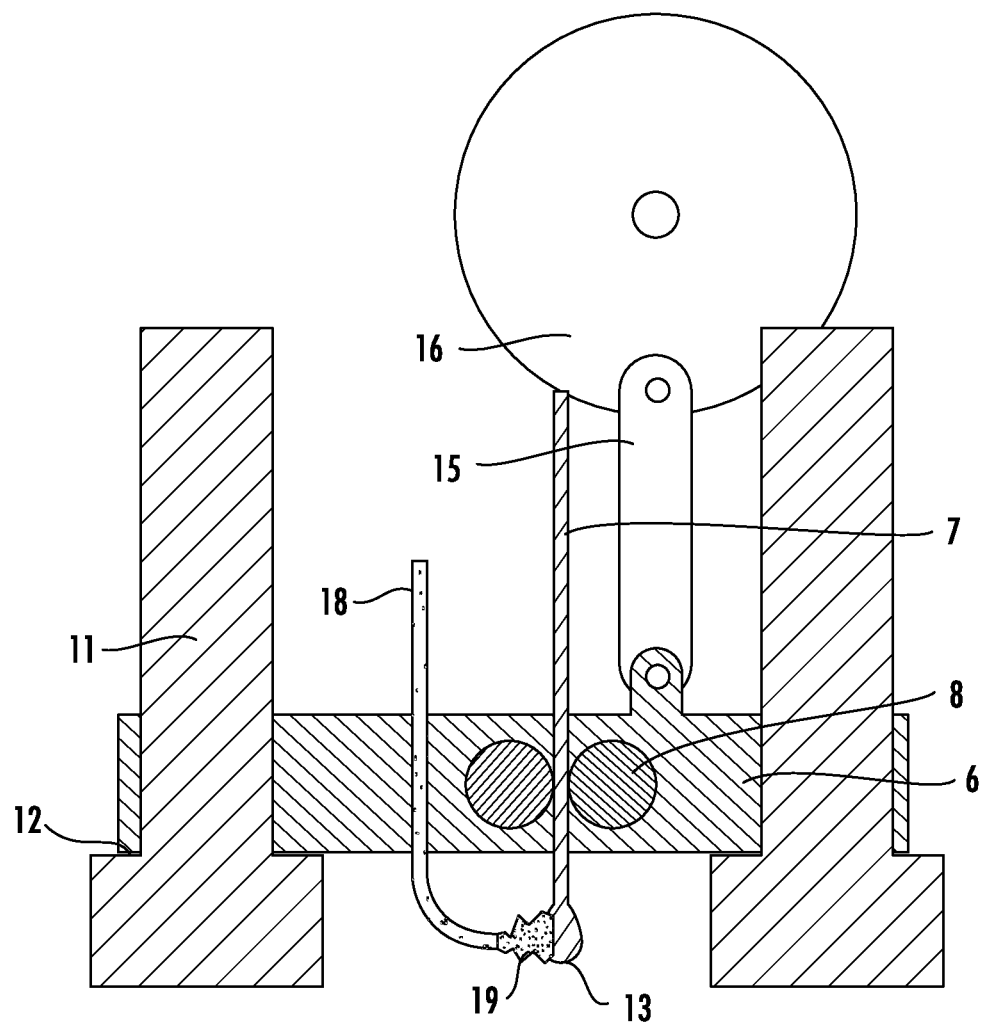

In another embodiment, the heat source used to melt the tip of the metal microwire 7 might not be a laser or induction coil but a plasma arc. Embodiments that utilize a plasma arc 19 are shown in FIGS. 7A-7B. Similar components have been given identical reference designators. In the embodiment shown in FIG. 7A, a plasma arc 19 is created between two electrodes 18 by applying an electric potential across the gap of the electrodes 18 which may or may not be filled with gas other than air, such as shield gas. The voltage applied to the electrodes 18 may be an AC or DC voltage. The magnitude of the voltage may be determined based on the distance between the electrode 18, the thickness of the metal microwire 7 and the type of metal used. The voltage may be applied to one electrode or both electrodes. Those skilled in the art may readily determine the appropriate magnitude of the voltage based on these parameters. The plasma arc 19 is hot enough to melt the metal microwire 7 from solid to liquid. The tip of the metal microwire 7 is advanced into the plasma arc 19, which will heat and transition the metal microwire 7 to liquid state.

In the embodiment shown in FIG. 7B, the tip of the metal microwire 7 serves as one of the two electrodes 18 creating the plasma arc 19 which will also heat and transition the metal microwire 7 to liquid state. In certain embodiments, the metal microwire 7 is grounded and the electrode 18 is supplied with a voltage, which may be AC or DC voltage. Further, the voltage applied to the electrode 18 may be positive or negative. In other embodiments, this voltage may be applied to the metal microwire 7. In yet other embodiments, voltages are applied to both the metal microwire 7 and the electrode 18. These voltages may be AC or DC, positive or negative and may vary in magnitude.

In some embodiments, the heat source is designed such that the quantity and rate of heat energy applied to the tip of the metal microwire 7 is such that the metal microwire 7 above the tip remains a solid. In other embodiments, the metal microwire above the tip remains a solid due to active temperature management of the metal microwire 7, such as via conduction or convection.

In all embodiments, the droplet size is controlled by the distance the metal microwire 7 is advanced by the actuator 8. In some embodiments, the metal droplets 13 may have a diameter in the range of 150 to 3000 micrometers. Additionally, one or more droplets may be skipped by not advancing the metal microwire 7.

In certain embodiments, a hard stop 12 may be provided on the linear guide 11.

The metal droplet 13 may be separated from the tip of the metal microwire 7 through a change in momentum. Three different embodiments are described, each capable of creating changes in momentum, which impart a force to the metal droplet 13 that may be in excess of 10G. In certain embodiments, the force is in excess of 100G. In some embodiments, the force applied to the metal droplet 13 may be on the order of 1000G or more, thus reducing the influence of gravity on the orientation of the droplet separation and subsequent trajectory to a minimum.

In the first embodiment, shown in FIGS. 4A-4D, the metal droplet 13 is released using oscillation. First, as shown in FIG. 4A, the carriage 6 starts to move in a first oscillating direction due to the rotation of rotating component 16. This may be the downward direction. As shown in FIG. 4B, while the carriage 6 is moving in the first oscillating direction, the metal microwire 7 is advanced by the actuator 8 and the wire tip is melted from solid to liquid phase. The amount of metal that forms the droplet is determined by the speed of the actuator 8, the speed of the carriage 6, and the diameter of the microwire. The molten metal droplet receives the direction of the movement. At the end of the oscillation movement, shown in FIG. 4C, the carriage 6 decelerates, changes direction and accelerates again in the opposite second direction. The rate of deceleration, the rate of acceleration, the velocity and the distance traveled for the oscillation movement are chosen according to microwire diameter, droplet diameter and droplet mass in order to force a separation of the metal droplet 13 from the metal microwire 7 and guarantee that the metal droplet 13 continues its movement in the direction received during the original first direction of the oscillation movement (see FIG. 4B). As shown in FIG. 4D, the carriage 6 travels in the second, opposite, direction until it reaches its original position where it decelerates, changes direction and accelerates again to start the next period cycle. Note that while FIGS. 4A-4D show the oscillation occurring in the Z direction, the carriage 6 and linear guides 11 may be configured so that the oscillation occurs in the X or Y direction. While FIGS. 4A-4D show a printhead with a laser, it is understood that the same sequence applied to a printhead with another heat source, such as an induction coil or a plasma arc.

In the second embodiment, shown in FIGS. 5A-5D, the metal droplet 13 is released using oscillation with a hard stop. This embodiment is similar to the previous embodiment. First, as shown in FIG. 5A, the carriage 6 moves in a first oscillating direction due to the rotation of rotating component 16. This may be the downward direction. As shown in FIG. 5B, while the carriage 6 is moving in the first oscillating direction, the metal microwire 7 is advanced by the actuator 8 and the wire tip is melted from solid to liquid phase. The amount of metal that forms the droplet is determined by the speed of the actuator 8, the speed of the carriage 6, and the diameter of the microwire. The molten metal droplet receives the direction of the movement. At the end of the oscillation movement, shown in FIG. 5C, the carriage 6 decelerates, strikes the hard stop 12, changes direction and accelerates again in the opposite direction. The rate of deceleration, the rate of acceleration, the velocity and the distance traveled for the oscillation movement are chosen according to microwire diameter, droplet diameter and droplet mass in order to force a separation of the metal droplet 13 from the metal microwire 7 and guarantee that the metal droplet 13 continues its movement in the direction received during the original first direction of the oscillation movement (see FIG. 5B). In certain embodiments, the carriage 6 may not decelerate before striking the hard stop 12. As shown in FIG. 5D, the carriage 6 travels in the second, opposite, direction until it reaches its original position where it decelerates, changes direction and accelerates again to start the next period cycle. Note that while FIGS. 5A-5D show the oscillation occurring in the Z direction, the carriage 6 and linear guides 11 may be configured so that the oscillation occurs in the X or Y direction. Additionally, while FIGS. 5A-5D show a printhead with a laser, it is understood that the same sequence applied to a printhead with another heat source, such as an induction coil or a plasma arc.

In the third embodiment, shown in FIGS. 6A-6D, the metal droplet 13 is released using momentum transfer. In this embodiment, the carriage is exposed to periodic momentum transfers. First, as shown in FIG. 6B, while the carriage 6 is moving in the first oscillating direction, the metal microwire 7 is advanced and the wire tip is melted from solid to liquid phase. The amount of metal that forms the droplet is determined by the speed of the actuator 8, the speed of the carriage 6, and the diameter of the microwire. Upon formation of the desired droplet, the carriage 6 receives a momentum in the desired direction of droplet movement and transfers that momentum to the molten metal droplet, as shown in FIG. 6C. For example, in one embodiment, the carriage 6 is stationary. The rod 15 is in communication with a mass 17. As the rotating component 16 rotates, the mass 17 moves up and down. The rod 15 and the mass 17 are dimensioned such that the mass 17 impacts the carriage 6 at the bottom of its stroke. Upon receiving the momentum, the metal droplet 13 separates from the metal microwire 7 and moves in the direction of the momentum, as shown in FIG. 6D. The next period cycle starts. Additionally, while FIGS. 6A-6D show a printhead with a laser, it is understood that the same sequence applied to a printhead with another heat source, such as an induction coil or a plasma arc.

Figure 8:
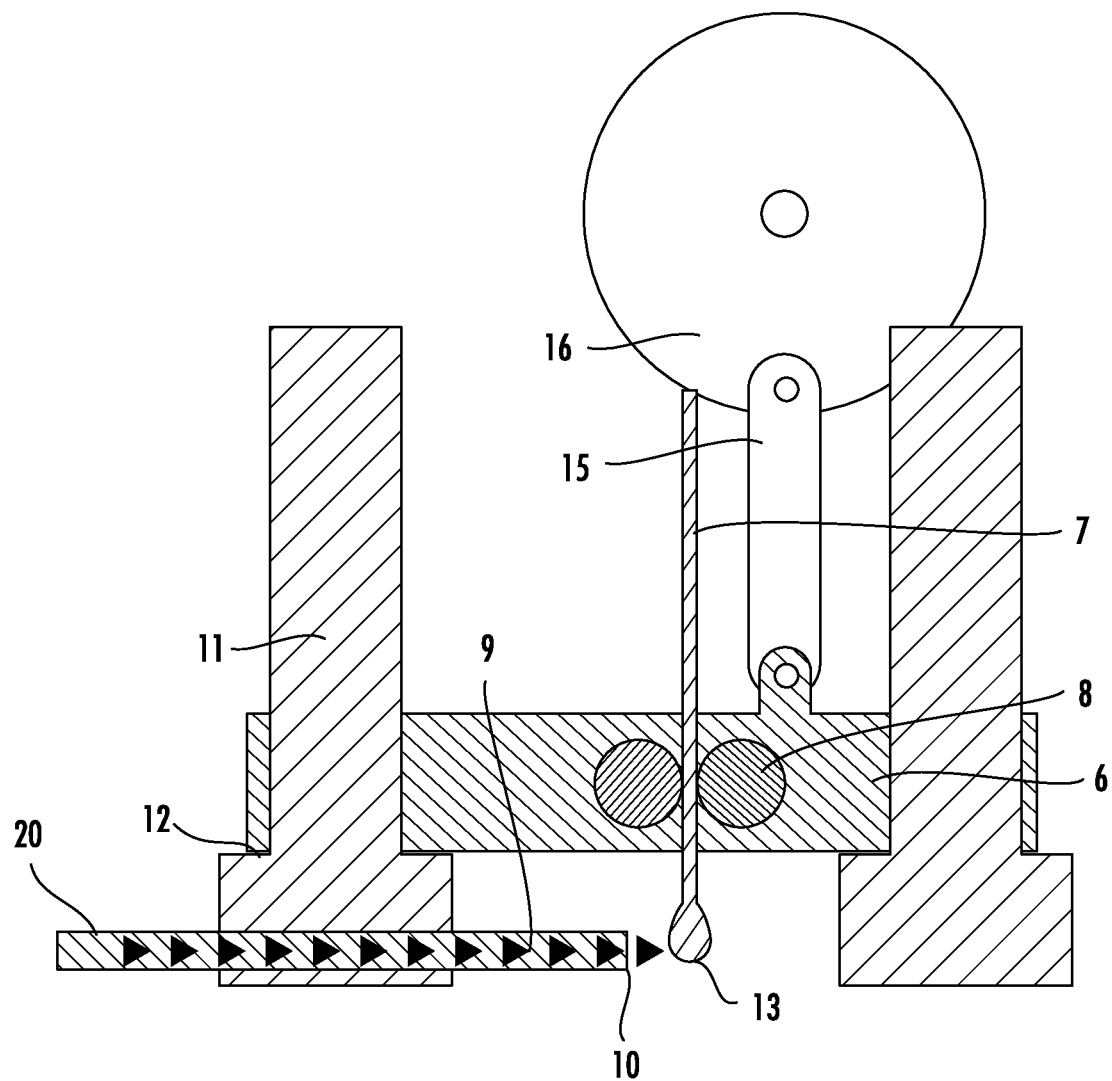
FIG. 8 shows a printhead with a stationary heat source.

While each of the previous figures shows the heat source as being mounted or coupled to the carriage, other embodiments are also possible. For example, as shown in FIG. 8, the heat source 20, which may be a laser beam, induction coil or plasma arc is not fixed to the carriage 6 but remains stationary in relation to the linear guides 11. Other aspects of this embodiment are similar to those described above and similar components have been given identical reference designators. In this embodiment, the heat source 20 is located at the point where the oscillation reverses direction and the metal droplet 13 separates from the tip of the metal microwire 7.

FIGS. 9A-9D show the operation of the printhead of FIG. 8. As shown in FIG. 9A, the sequence of events starts with the metal microwire 7 in the full advanced position while the carriage 6 starts to move in the first direction. This may be the downward direction. The motion of the carriage 6 will cause the metal microwire 7 to be inserted into the heat source 20 which will melt the metal microwire 7 from solid to liquid form. During the movement in the first direction, metal microwire 7 is continuously advanced into the heat source by the actuator 8, increasing the amount of metal used to form the droplet. At the end of the oscillation movement, shown in FIG. 9C, the carriage 6 decelerates, changes direction and accelerates again in the opposite second direction. The rate of deceleration, the rate of acceleration, the velocity and the distance traveled for the oscillation movement are chosen according to microwire diameter, droplet diameter and droplet mass in order to force a separation of the metal droplet 13 from the metal microwire 7 and guarantee that the metal droplet 13 continues its movement in the direction received during the original first direction of the oscillation movement, as shown in FIG. 9C. As shown in FIG. 9D, the carriage 6 travels in the second, opposite, direction until it reaches its original position where it decelerates. During the motion in second direction, the metal microwire 7 is advanced to start the next period cycle. This embodiment of the mechanism has advantages in regards to timing of events and might be used to achieve certain frequencies of droplet generation.

Although not shown, the embodiments of FIGS. 5A-5D and 6A-6D may also be implemented using a heat source that remains stationary with respect to the linear guides 11.

In each of these embodiments, the controller 5 may be in communication with the actuator 8, the motor that controls the rotating component 16, and the heat source to perform the actions described herein.

All embodiments described herein can be used in various, non-vertical orientations. As described above, the force that is exerted upon the metal droplet 13 and causes the metal droplet 13 to separate from the metal microwire 7 may be much greater than the force of gravity. The momentum's direction, which is also the direction of the printhead's oscillation, will be maintained by the metal droplet 13 and determines its trajectory. In a non-vertical orientation, gravity will have a small influence on the droplet's trajectory, possibly causing the otherwise straight trajectory to be slightly curved. Compared to the force of molten metal surface tension, gravity also has a small influence of sub millimeter scale molten metal droplets, thus enabling layer by layer fabrication of molten metal droplet structures on a vertical platform.

The embodiments described in this disclosure may have many advantages. The separation of the droplet may be more predictable and the timing of this separation may also be more predictable. Additionally, the present system has the capability for creating droplets of a higher temperature and from different types of metal. This system also allows a higher frequency with which droplets can be separated. The system can also be parallelized into an array of droplet generators, resulting in higher throughput and lower unit cost.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for forming molten metal droplets on demand comprising:
   a carriage;
   an actuator, wherein metal microwire is advanced by the actuator;
   a heat source positioned proximate a tip of the metal microwire, thereby causing the tip of the metal microwire to be heated past its melting point such that a droplet is formed; and
   a mechanism to create a change in a first momentum of the carriage, wherein the change in the first momentum of the carriage causes the droplet to separate from the tip of the metal microwire and move in the direction of the first momentum.

2. The system of claim 1 further comprising a substrate for receiving the droplet, wherein the substrate is movable relative to the carriage in an X, Y, and Z direction.

3. The system of claim 1, wherein the carriage is disposed between linear guides, such that movement of the carriage is limited to one direction by the linear guides.

4. The system of claim 3, wherein the change in momentum of the carriage is accomplished by oscillatory motion of the carriage within the linear guides.

5. The system of claim 3, wherein the change in momentum of the droplet relative to the tip of the metal microwire is accomplished by oscillatory motion of the carriage with a hard stop against the linear guides.

6. The system of claim 1, wherein the change in momentum of the droplet relative to the tip of the metal microwire is accomplished by momentum transfer to the droplet by a mass striking the carriage.

7. The system of claim 1, wherein the heat source comprises a laser to emit a laser beam.

8. The system of claim 7, wherein light from the laser is delivered to a region proximal to the tip of the metal microwire by a fiber optic cable.

9. The system of claim 8, wherein the fiber optic cable comprises a lens to focus the laser beam on the tip of the metal microwire.

10. The system of claim 1, wherein the heat source comprises an induction coil positioned around the tip of the metal microwire.

11. The system of claim 1, wherein the heat source comprises two electrodes, wherein a voltage is applied to at least one of the two electrodes to create a plasma arc proximate the tip of the metal microwire.

12. The system of claim 1, wherein the heat source comprises an electrode, where a voltage is applied to at least one of the electrode and the metal microwire to create a plasma arc proximate the tip of the metal microwire.

13. The system of claim 1, further comprising at least a second actuator, wherein there are a plurality of supplies of metal microwire each being fed by its own respective actuator, and each being melted by a heat source, with each droplet separating due to the change in momentum of the carriage.

14. The system of claim 1, wherein the heat source is affixed to the carriage and the actuator feeds metal microwire toward the heat source while the carriage is moving.

15. The system of claim 3, wherein the heat source is affixed to one of the linear guides, such that the heat source does not move with the carriage.

16. The system of claim 1, wherein the carriage moves in an up and down direction.

17. The system of claim 1, wherein the actuator is mounted on the carriage.

18. The system of claim 1, wherein the heat source is designed such that the quantity and rate of heat energy applied to the tip of the metal microwire is such that the metal microwire above the tip remains a solid.

19. The system of claim 1, wherein the microwire above the tip remains a solid due to active temperature management of the metal microwire.

* * * * *